United States Patent Office 2,986,580
Patented May 30, 1961

2,986,580
MESITYL OXIDE COPOLYMERS
Paul A. Devlin, Orinda, Calif., assignor to Shell Oil Company, a corporation of Delaware
No Drawing. Filed Apr. 25, 1958, Ser. No. 730,806
8 Claims. (Cl. 260—593)

This invention relates to new and improved copolymers and more specifically to novel and useful copolymers of mesityl oxide and diethylenically unsaturated hydrocarbons. Still more specifically, it relates to copolymers of mesityl oxide and diethylenically unsaturated hydrocarbons having conjugated double bonds, and to a method for preparing such copolymers. In particular, this invention relates to copolymers of mesityl oxide and butadiene which are particularly suitable for can liners, and to a process for their preparation.

The ideal can liner is characterized by the qualities of low cost, pore-free uniformity of coating, stability during can-forming operations, good adhesion, and complete insolubility in such aqueous liquids as soft drinks and beer, as well as tastelessness and lack of toxicity. While a variety of resins display many of these requirements, it has been found that the resins with good physical and chemical properties are expensive, and the inexpensive resins lack some of the desired physical or chemical properties. Epoxy resins which, until recently, have been the most preferred class of can-lining materials, are relatively expensive and, furthermore, it is necessary to employ them in solvents which must be subsequently removed from the coated metal sheet prior to baking the resin in place.

Because of their relatively good properties for can liners and extremely low cost, polymers and copolymers including such diolefins as butadiene have been examined for use as can liners. While diolefins have been copolymerized with such alpha,beta-unsaturated ketones as benzalacetophenone, benzal acetone, and methyl vinyl ketone, however, it has heretofore not been possible to prepare copolymers of diolefins with mesityl oxide and, indeed, it has been reliably reported that copolymers of butadiene and mesityl oxide could not be obtained, Industrial and Engineering Chemistry 45, 1536, July 1953.

It is an object of this invention to provide a novel and inexpensive copolymer of mesityl oxide and diolefin, and a further object to provide a process for preparing such a copolymer. A further object of the invention is the provision of a mesityl oxide-diolefin copolymer having superior qualities as a can liner. A still further object is to provide a copolymer which may be easily and inexpensively applied to sheet metal without the use of solvents. Other objects will be apparent from the following description of the invention.

These objects are accomplished in the following invention by copolymerizing mesityl oxide with a conjugated diethylenically unsaturated hydrocarbon. The copolymerization process is achieved by reacting the hydrocarbon in solution in the ketone as, for example, by dissolving the hydrocarbon in the ketone at a low temperature and then raising the temperature to permit the copolymerization to take place. Thus, the mesityl oxide serves both as the comonomer in the reaction and as the solvent in which the copolymerization is conducted.

For the diethylenically unsaturated hydrocarbon reactant may be employed those diolefins wherein the two double bonds are in conjugated relationship to one another, as in the case of the compounds 1,3-pentadiene, 2-methyl-1,3-butadiene, 2,4-hexadiene, 1,3-heptadiene, 2,4-undecadiene and similar dienes. In general, of this group, those conjugated dienes having no more than ten carbon atoms are preferred. Most preferred of all of the conjugated diethylenically unsaturated hydrocarbons in this invention is 1,3-butadiene.

For the purposes of illustration, the copolymerization process will be discussed in terms of the preferred reactants mesityl oxide and 1,3-butadiene, but it should be understood that the invention is not limited to these compounds, and other conjugated diolefins may, of course, be employed.

In general the preferred mode of conducting the copolymerization is to dissolve the butadiene in an excess of the mesityl oxide in which it is quite soluble. Preferably, chilled mesityl oxide is saturated with butadiene at a given temperature. This mixing of the reactants may be conducted at any temperature, but it is most conveniently conducted at some temperature between the melting point of mesityl oxide, −59° C., and about room temperature. The reactants may be combined in a wide range of proportions, but the weight ratios found to be most convenient extend from about one part of butadiene per ten parts of mesityl oxide to about five parts of butadiene per ten parts of mesityl oxide.

The polymerization is preferably conducted at a temperature between about 75° C. and 175° C., although temperatures in excess of this range will be found operative. Since these temperatures are in excess of the boiling point at atmospheric pressure of the butadiene, the polymerization should be conducted under conditions such that the reactants are maintained in their liquid state as, for example, by use of superatmospheric pressures. These pressures can be generated by the system itself, i.e., autogenous pressures, or by the use of blankets of such inert gases as nitrogen or carbon dioxide.

The reactants employed in this invention are sufficiently reactive so that the copolymerization may be conducted without the use of a polymerization catalyst. Preferably, however, a polymerization catalyst is employed in an amount sufficient to increase the reaction rate, and it has been found that amounts of catalyst from about 0.5% to about 40% by weight, based on the butadiene, will give copolymers under convenient conditions of time and temperature. The use of less catalyst appears to reduce the rate materially, while the use of more catalyst is uneconomical. Best results are, however, found when from 3 to 6% by weight, based on the copolymer, are employed.

Since the copolymerization reaction of this invention is conducted at temperatures in excess of about 75° C., polymerization catalysts or initiators, as they are sometimes termed, which are effective at about that temperature are required.

While many polymerization catalysts are operative in the invention, such as perbenzoates and other well-known classes of materials, the class of catalysts consisting of the peroxides, such as $H_2O_2$, and particularly the organic peroxides, such as benzoyl peroxide, is preferred. Most preferred of this class is di-tert-butyl peroxide.

Inasmuch as the desired copolymers of this invention are those liquid low-molecular weight materials having molecular weights of less than about 5000, the polymerization reaction will take only a relatively short time and, in fact, it has been found that by conducting the batchwise reaction at about 140° C., suitable copolymers could be achieved in less than seven hours. Depending on the temperature of the reaction, the catalyst concentration and other variables, periods as short as two hours will afford suitable polymeric materials.

Under the conditions of the reaction, the copolymerization may be conducted until practically all of the butadiene is polymerized, or the reaction may be terminated at an intermediate conversion thereof. In either case, the polymerization may be readily stopped by such well-known methods as cooling the reaction vessel or by boiling from the vessel the unreacted mesityl oxide solvent and the butadiene, thus leaving behind the liquid copolymer.

Although the invention has been described in terms of employing the mesityl oxide as the only solvent, other solvents for the copolymerization reaction may be employed in conjunction with the ketone. Such diluents preferably comprise those organic liquids in which both the reactants and product are soluble. Examples of suitable diluents include benzene, toluene, xylene, the paraffins, and other liquids that will be apparent to those skilled in the art.

The process of the invention can be conducted in a batchwise manner or, since the reactants and product copolymer are liquids, it may be conducted in a semi-continuous or continuous operation. In the latter case the butadiene and catalyst may easily be added to streams of mesityl oxide, and the excess reactants may readily be stripped from the liquid polymer at the termination of the reaction.

The mesityl oxide-diolefin copolymers that are produced by the process of the invention are mobile to viscous light-colored liquids whose molecular weight is preferably between about 700 and about 5000. Resins containing from about 2 to about 35%, and more particularly from about 3 to about 18%, of the mesityl oxide constituent, are preferred, inasmuch as they display the best properties for coating compositions. When spread on metal surfaces and baked at such temperatures as about 300° to 500° F., particularly around 400° F., the copolymer forms a continuous flexible light-colored protective coating having excellent toughness, impact resistance, and adhesion to the metal backing. Inasmuch as the copolymer requires no solvent to render it fluid, it is particularly applicable to can-coating and solventless primer applications wherein it may be applied directly to the surface to be coated as, for example, by roller coating or dipping, and then baked in place without the need for the removal of solvent.

The various modifications of the invention and the application of the new compounds are illustrated in the following examples. It is to be understood, however, that the examples are for the purposes of illustration, and the invention is not to be regarded as limited to the specific materials or conditions recited therein. Unless otherwise noted, all proportions given in the examples are in parts by weight.

*Example I.—Preparation of butadiene-mesityl oxide copolymers*

Various weights of 1,3-butadiene were dissolved in weighed samples of mesityl oxide containing catalyst and the mixtures heated in sealed bombs under known conditions. At the end of each reaction, the unreacted materials were stripped from the copolymer, and the copolymer analyzed to determine its composition and molecular weight. The results of a number of such experiments appear in the following Table I.

TABLE I

| Run | Olefin | Parts Olefin | Parts Mesityl Oxide by Wt. | Parts Solvent by Wt. | Catalyst | Parts Catalyst by Wt. | Time, Hours | Temp., °C. | Parts Polymer Product | M.W. Polymer | Percent Mesityl Oxide in Polymer | Parts Catalyst Per 100 Parts Polymer |
|---|---|---|---|---|---|---|---|---|---|---|---|---|
| 1 | Isoprene | 20 | 50 | 0 | Tert-butyl perbenzoate. | 1 | 1 | 105 | | | | |
| 2 | do | 20 | 50 | 0 | do | 1 | 2 | 105 | | | | |
| 3 | do | 20 | 50 | 0 | do | 1 | 5 | 105 | | | | |
| 4 | Butadiene | 28 | 49 | 200 (toluene) | Di-tert-butyl peroxide. | 2 | 1 | 140 | 11 | | 2.9 | 18.2 |
| 5 | do | 30 | 170 | 0 | do | 4 | 7 | 140 | 38 | 1,250 | 14 | 10.5 |
| 6 | do | 34 | 170 | 0 | do | 4 | 6 | 140 | 44 | 1,600 | 11 | 8.8 |
| 7 | do | 30 | 170 | 0 | do | 2 | 6 | 140 | 33 | | 9.7 | 6.1 |
| 8 | do | 30 | 170 | 0 | 50% H₂O₂ | 2 | 6.5 | 140 | 31 | 972 | 7.8 | |
| 9 | do | 31 | 170 | 0 | 50% H₂O₂ | 2 | 6.5 | 140 | 17 | | | |
| 10 | do | 100 | 724 | 0 | Di-tert-butyl peroxide. | 16 | 6 | 140 | 120 | 1,165 | 17.6 | 13.3 |
| 11 | do | 129 | 724 | 0 | None | 0 | 4.5 | 130 | 37 | | | |
| 12 | do | 176 | 642 | 0 | Di-tert-butyl peroxide. | 8 | 6 | 138 | 151 | 4,170 | 5.2 | 5.3 |
| 13 | do | 169 | 595 | 0 | do | 4 | 6 | 137 | 120 | 4,630 | 3.7 | 3.3 |
| 14 | do | 163 | 610 | 0 | do | 4 | 6 | 134 | 111 | 4,600 | 4.1 | 3.6 |
| 15 | do | 167 | 620 | 0 | do | 4 | 6 | 134 | 86 | | | |
| 16 | do | 152 | 650 | 0 | do | 4 | 3 | 152 | 108 | 4,330 | 4.7 | 3.7 |
| 17 | do | 142 | 650 | 0 | do | 4 | 3 | 166 | 102 | 2,800 | 5.3 | 3.9 |
| 18 | do | 169 | 610 | 0 | do | 4 | 3 | 145 | 107 | 4,834 | 4.7 | 3.7 |

In the first three runs, the presence of polymer was established by observation of an increase in the refractive index of the reaction mixture at the end of the run over that at the beginning of the run.

In the remaining runs, the amount of combined mesityl oxide in the polymer was determined by measuring the carbonyl content thereof. The resins resulting from these experiments were mobile to viscous light-colored liquids.

*Example II.—Preparation of coatings from butadiene-mesityl oxide copolymers*

Samples of liquid resins prepared as in the previous example were spread on sheets of tin-plated sheet steel and baked for 15 minutes at 400° F. At the end of that time the resins had baked to a tough, light-colored extremely adherent solid coating. Samples of these coatings having thicknesses of 0.15 to 0.20 mils were tested for physical properties, and the results of these tests appear in the following Table II, while in Table III are presented the results of a test on a one mil thick coating similarly prepared but with 0.01% cobalt metal on resin solids.

TABLE II

| | Run 10 | Run 14 |
|---|---|---|
| Flex, ⅛" mandrel | OK | OK. |
| Double bend test | OK | OK. |
| Impact, in lb | >62 | >62. |
| Hardness, pencil | F | H. |
| Adhesion | OK | OK. |
| Autoclave, water at 250° F., 6 hours Condition of film | No effect | No effect. |
| Chemical resistance, 1 hour: | | |
| Xylene | No effect | No effect. |
| Methyl ethyl ketone | Very slightly soft. | Slightly soft. |
| Methyl isobutyl ketone | No effect | No effect. |
| 20% NaOH | Very soft | Slightly soft. |
| 20% H₂SO₄ | No effect | No effect. |

TABLE III

|  | Run 10 | Run 14 |
|---|---|---|
| Percent Solids at E-F viscosity [1] | 72 | 42. |
| Flex, 1/8" mandrel | OK | OK. |
| Double bend test | OK | OK. |
| Impact, in lb | 31 | >62. |
| Boiling water, 4 hr | No effect | |

[1] Solvent was a mixture of hydrocarbons consisting of about 20% aromatics, mostly xylenes, and the remainder saturated aliphatics of about 11–12 carbon atoms, having a boiling range of 300–400° F.

*Example III.—Preparation of resin by continuous method*

A number of samples of mesityl oxide-butadiene copolymers were prepared by continuously feeding butadiene and polymer to the ketone mixture. To a reaction mixture consisting essentially of an excess of mesityl oxide heated to 150° C. in a 5-gallon autoclave was continuously fed, in each run, ditert-butyl peroxide catalyst in mesityl oxide solution, and butadiene. The feeding was continued for about four hours, and then the mixture allowed to polymerize without added reactant for the remainder of each run.

At the end of each run, the resin was separated from the unreacted ingredients by Claisen distillation at about 2 mm. at 150° C., and the mesityl oxide thus recovered was recycled to the next run. The data on the resins thus obtained are presented in the following table.

Analysis of the recycled mesityl oxide stream showed the presence of vinyl cyclohexene, the dimer of butadiene. Since the dimer is present at the locus of the polymerization reaction, the product includes combined vinyl cyclohexene.

from 700 to 5000 and containing from about 2 to about 35% of combined mesityl oxide.

5. A process for the preparation of liquid copolymers of mesityl oxide and diethylenically unsaturated hydrocarbons having a molecular weight between about 700 and about 5000 and containing from 2% to 35% combined mesityl oxide consisting of reacting from 1 to 5 parts of a conjugated diethylenically unsaturated hydrocarbon in solution in about 10 parts of mesityl oxide in a homogeneous liquid phase at a temperature in excess of about 75° C.

6. A process for the preparation of liquid copolymers of mesityl oxide and conjugated diethylenically unsaturated hydrocarbons having a molecular weight between about 700 and about 5000 and containing from 2% to 35% combined mesityl oxide consisting of reacting from 1 to 5 parts of a diethylenically unsaturated hydrocarbon having conjugated double bonds in about 10 parts of mesityl oxide in the presence of less than 40% by weight, based on the hydrocarbon, of a peroxide in a homogeneous liquid phase at a temperature in excess of about 75° C.

7. A process for the preparation of liquid copolymers of mesityl oxide and butadiene having a molecular weight between about 700 and about 5000 and containing from 2% to 35% combined mesityl oxide consisting of reacting from 1 to 5 parts of butadiene in about 10 parts of mesityl oxide in homogeneous liquid phase at a temperature of from about 75° C. to about 175° C.

8. A process for the preparation of liquid copolymers of mesityl oxide and butadiene, consisting of reacting about 1 to 5 parts by weight of butadiene having a molec-

TABLE IV

| Continuous Run | Total Parts Mesityl Oxide | Total Parts Butadiene | Total Parts Di-t-butyl Peroxide | Percent Copol. in Final Solution | Parts Peroxide per 100 parts Copol. | Total Copolymerization Time (hr.) | Copolymer Analysis ||||||||
|---|---|---|---|---|---|---|---|---|---|---|---|---|---|
| | | | | | | | Percent Mesityl Oxide on— || C, Percent w. | H, Percent w. | O, Percent w. by Diff. | Mol. Wt. of Resin | Gardner Color | Gardner Holdt Viscosity |
| | | | | | | | Carbonyl Value | Oxygen Value | | | | | | |
| 1 | 83.4 | 15.1 | 1.49 | 14.7 | 10.1 | 4.7 | 17.5 | 28.8 | 84.4 | 10.9 | 4.7 | 1,049 | | Z |
| 2 | 71.6 | 27.1 | 1.31 | 23.1 | 5.6 | 5.0 | 8.3 | 14.4 | 86.6 | 11.1 | 2.3 | 2,310 | 2 | Z6–Z7 |
| 3 | 67.9 | 31.1 | 1.03 | 26.6 | 3.7 | 4.3 | 4.8 | 8.6 | 87.5 | 11.1 | 1.4 | 3,500 | <1 | Z10 |
| 4 | 69.0 | 29.6 | 1.43 | 27.8 | 4.6 | 5.5 | 5.8 | 6.1 | 88.2 | 11.1 | 0.7 | 2,900 | <1 | Z9–Z10 |
| 5 | 67.4 | 31.1 | 1.56 | 26.8 | 5.2 | 5.8 | 6.9 | 11.1 | 87.1 | 11.1 | 1.8 | 2,250 | <1 | Z6–Z7 |

I claim as my invention:

1. A composition of matter consisting of a liquid copolymer of mesityl oxide and a conjugated diethylenically unsaturated hydrocarbon having a molecular weight between about 700 and about 5000 and containing from 2% to 35% combined mesityl oxide.

2. A composition of matter consisting of a liquid copolymer of mesityl oxide and a diethylenically unsaturated hydrocarbon having conjugated double bonds and less than ten carbon atoms having a molecular weight between about 700 and about 5000 and containing from 2% to 35% combined mesityl oxide.

3. A composition of matter consisting of a liquid copolymer of mesityl oxide and butadiene having a molecular weight between 700 and about 5000 and containing from about 2% to about 35% of combined mesityl oxide.

4. A composition of matter comprising the copolymer of mesityl oxide and butadiene having a molecular weight between about 700 and about 5000 and containing from about 2% to 35% combined mesityl oxide in 10 parts of mesityl oxide in homogeneous liquid phase at a temperature of about 75° C. to about 175° C., in the presence of from 0.5 to 40% by weight of an organic peroxide, based on the butadiene.

References Cited in the file of this patent

UNITED STATES PATENTS

| 2,349,136 | Britton et al. | May 16, 1944 |
| 2,386,447 | Dreisbach | Oct. 9, 1945 |

FOREIGN PATENTS

| 786,119 | Great Britain | Nov. 13, 1957 |

OTHER REFERENCES

Marvel et al.: Ind. & Eng. Chem., vol. 45, No. 7, pp. 1532–1536, 1953.